United States Patent
Gunderson et al.

(10) Patent No.: US 7,372,651 B2
(45) Date of Patent: May 13, 2008

(54) INTRODUCING A NOISE SIGNAL INTO A READ-BACK SIGNAL WHEN DATA IS WRITTEN TO A REMOVABLE DATA STORAGE MEDIUM

(75) Inventors: Dan Gunderson, Westminister, CO (US); Mark Moyer, Westminister, CO (US); Chung Song, Aurora, CO (US); Ryan McCallister, Lafayette, CO (US)

(73) Assignee: Quantum Corporation, San Jose, CA (US)

( * ) Notice: Subject to any disclaimer, the term of this patent is extended or adjusted under 35 U.S.C. 154(b) by 794 days.

(21) Appl. No.: 10/383,856

(22) Filed: Mar. 7, 2003

(65) Prior Publication Data

US 2004/0174629 A1 Sep. 9, 2004

(51) Int. Cl.
*G11B 5/09* (2006.01)

(52) U.S. Cl. .......................... 360/53; 360/31; 360/46; 360/65

(58) Field of Classification Search .. 360/78.01–78.02, 360/77.12, 77.17, 77.16, 76, 53, 31, 46, 65, 360/51, 32, 25, 55; 324/212, 210, 412; 369/131; 358/3.13, 3.14, 3.19, 3.16
See application file for complete search history.

(56) References Cited

U.S. PATENT DOCUMENTS

| | | | |
|---|---|---|---|
| 4,404,605 A | 9/1983 | Sakamoto | |
| 4,760,471 A | 7/1988 | Brush et al. | |
| 4,794,467 A | 12/1988 | Okuyama et al. | |
| 4,935,827 A * | 6/1990 | Oldershaw et al. | 360/77.16 |
| 5,157,563 A | 10/1992 | Nagasawa et al. | |
| 5,233,487 A * | 8/1993 | Christensen et al. | 360/77.04 |
| 5,347,407 A * | 9/1994 | Solhjell et al. | 360/53 |
| 5,408,366 A * | 4/1995 | Bentley et al. | 360/53 |
| 5,585,974 A * | 12/1996 | Shrinkle | 360/46 |
| 5,608,583 A * | 3/1997 | Shrinkle | 360/46 |

(Continued)

FOREIGN PATENT DOCUMENTS

EP 1 059 630 A1 12/2000

(Continued)

OTHER PUBLICATIONS

European Search Report mailed on Jun. 8, 2004, for EP patent application No. EP 04 25 1290 filed on Mar. 5, 2004, 3 pages.

*Primary Examiner*—Hoa T. Nguyen
*Assistant Examiner*—Dismery Mercedes
(74) *Attorney, Agent, or Firm*—Morrison Foerster LLP (57) ABSTRACT

In one exemplary embodiment, a noise signal is introduced into a read-back signal when data is written to a removable data storage medium. While writing the data to the removable data storage medium, a portion of the data written to the removable data storage medium is read from the removable data storage medium. An error rate is determined based on the portion of the data read from the removable data storage medium. A read-back signal is generated corresponding to the portion of the data read from the removable data storage medium, which is used to detect if an error occurred in writing the portion of the data to the removable data storage medium. A noise signal is added to the read-back signal. The noise signal is adjusted based on the determined error rate.

30 Claims, 4 Drawing Sheets

U.S. PATENT DOCUMENTS

| | | |
|---|---|---|
| 5,786,951 A * | 7/1998 | Welland et al. ................ 360/46 |
| 5,959,794 A * | 9/1999 | Indeck et al. ................. 360/25 |
| 5,982,718 A | 11/1999 | Takiguchi |
| 5,995,306 A * | 11/1999 | Contreras et al. ............. 360/31 |
| 6,031,671 A * | 2/2000 | Ayres ........................... 360/40 |
| 6,081,398 A * | 6/2000 | Ozue ............................ 360/64 |
| 6,172,831 B1 * | 1/2001 | Usui ............................ 360/64 |
| 6,226,441 B1 * | 5/2001 | Hartung et al. ............... 386/46 |
| 6,233,109 B1 * | 5/2001 | Melbye ........................ 360/63 |
| 6,512,644 B1 * | 1/2003 | Hall et al. .................... 360/31 |
| 6,671,111 B2 * | 12/2003 | Ottesen et al. ................ 360/31 |
| 6,690,542 B1 * | 2/2004 | Wang .......................... 360/129 |
| 6,771,442 B2 * | 8/2004 | Bliss et al. ................... 360/39 |
| 7,064,913 B2 * | 6/2006 | Gunderson et al. ........... 360/31 |
| 2003/0128448 A1 | 7/2003 | Gunderson et al. |

FOREIGN PATENT DOCUMENTS

EP        1 327 984 A1    7/2003

* cited by examiner

INTRODUCING A NOISE SIGNAL INTO A READ-BACK SIGNAL WHEN DATA IS WRITTEN TO A REMOVABLE DATA STORAGE MEDIUM

BACKGROUND

1. Field of the Invention

The present application generally relates to writing data to a removable data storage medium, and more particularly to introducing a noise signal into a read-back signal when data is written to a removable data storage medium.

2. Related Art

In a conventional data storage system that uses a removable data storage medium, data can be stored on the removable data storage medium using one data storage device and retrieved using another data storage device. Thus, the removable data storage medium can be interchangeably used in multiple data storage devices. Conversely, a data storage device can interchangeably use multiple removable data storage media. For example, when the removable data storage medium is a magnetic tape cartridge, data can be stored onto a magnetic tape in the magnetic tape cartridge using one tape drive, then the stored data can be retrieved from the magnetic tape cartridge using another tape drive.

During a write process, when data is stored on a removable data storage medium, a read-after-write operation can be used to check for errors in writing the data to the removable data storage medium. More particularly, during the write process, when data is written to the removable data storage medium by a write head, the data written to the removable data storage medium is read by a read head to generate a read-back signal. The read-back signal can be used to determine if an error occurred in writing the data to the removable data storage medium. If an error is detected, the data can be re-written.

During a read process, the data stored on the removable data storage medium is read by the read head to retrieve the data from the removable data storage medium. Thus, data written to the removable data storage medium is read during the write process to check for errors in writing the data and read during a read process to retrieve the data from the removable data storage medium. Because the removable data storage medium is interchangeable, the data can be read during the write process by one read head in a first data storage device and read during the read process by another read head in a second data storage device. However, in some circumstances, the read head in the first data storage device may be able to read the data during the write process but the read head in the second data storage device may not be able to read the same data during the read process. Thus, in these circumstances, because the data was not re-written, the data stored on the removable data storage medium by the first data storage device cannot be retrieved using the second data storage device, which reduces the interchangeability of the removable data storage medium.

SUMMARY

In one exemplary embodiment, a noise signal is introduced into a read-back signal when data is written to a removable data storage medium. While writing the data to the removable data storage medium, a portion of the data written to the removable data storage medium is read from the removable data storage medium. An error rate is determined based on the portion of the data read from the removable data storage medium. A read-back signal is generated corresponding to the portion of the data read from the removable data storage medium, which is used to detect if an error occurred in writing the portion of the data to the removable data storage medium. A noise signal is added to the read-back signal. The noise signal is adjusted based on the determined error rate.

DETAILED DESCRIPTION

The following description sets forth numerous specific configurations, parameters, and the like. It should be recognized, however, that such description is not intended as a limitation on the scope of the present invention, but is instead provided to provide a better description of exemplary embodiments.

Figure 1:
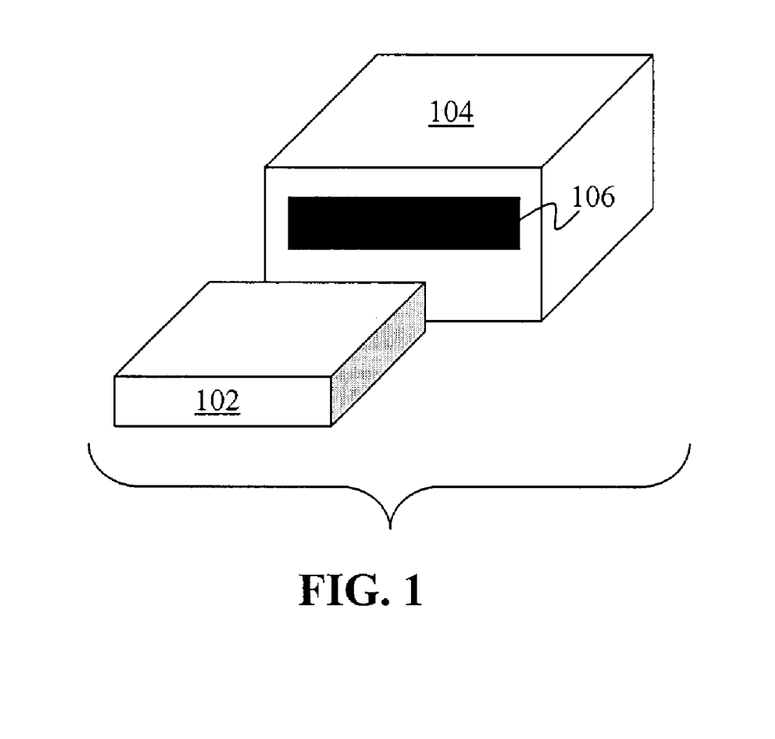
FIG. 1 depicts an exemplary data storage device and an exemplary removable data storage medium.

FIG. 1 depicts an exemplary embodiment of a data storage system with a removable data storage medium 102 and a data storage device 104. In the present exemplary embodiment, data storage device 104 includes a receptacle 106 configured to receive removable data storage medium 102. When a removable data storage medium 102 is loaded in receptacle 106, data storage device 104 writes data onto and/or reads data from removable data storage medium 102. Because removable data storage media 102 are interchangeable, a removable data storage medium 102 can be used in any number of different data storage devices 104. Conversely, data storage device 104 can be used with any number of different removable data storage media 102.

Figure 2:
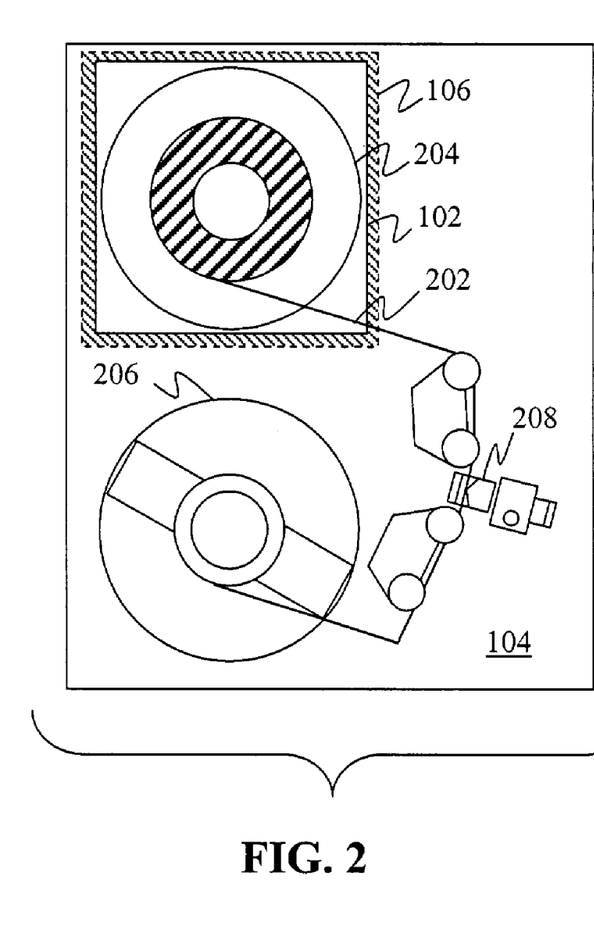
FIG. 2 depicts an exemplary tape drive and an exemplary tape cartridge.

For example, with reference to FIG. 2, removable data storage medium 102 can be a magnetic tape cartridge, and data storage device 104 can be a tape drive. Thus, in this example, when a magnetic tape cartridge 102 is loaded into a tape drive 104, a magnetic head 208 accesses (reads/writes) data on a magnetic tape 202 as the magnetic tape 202 is transferred between a supply reel 204 and a take-up reel 206. When magnetic tape 202 is spooled back onto supply reel 204, magnetic tape cartridge 102 can be removed from tape drive 104, then magnetic tape cartridge 102 can be used in another tape drive 104 and/or another magnetic tape cartridge 102 can be loaded into tape drive 104.

Figure 3:
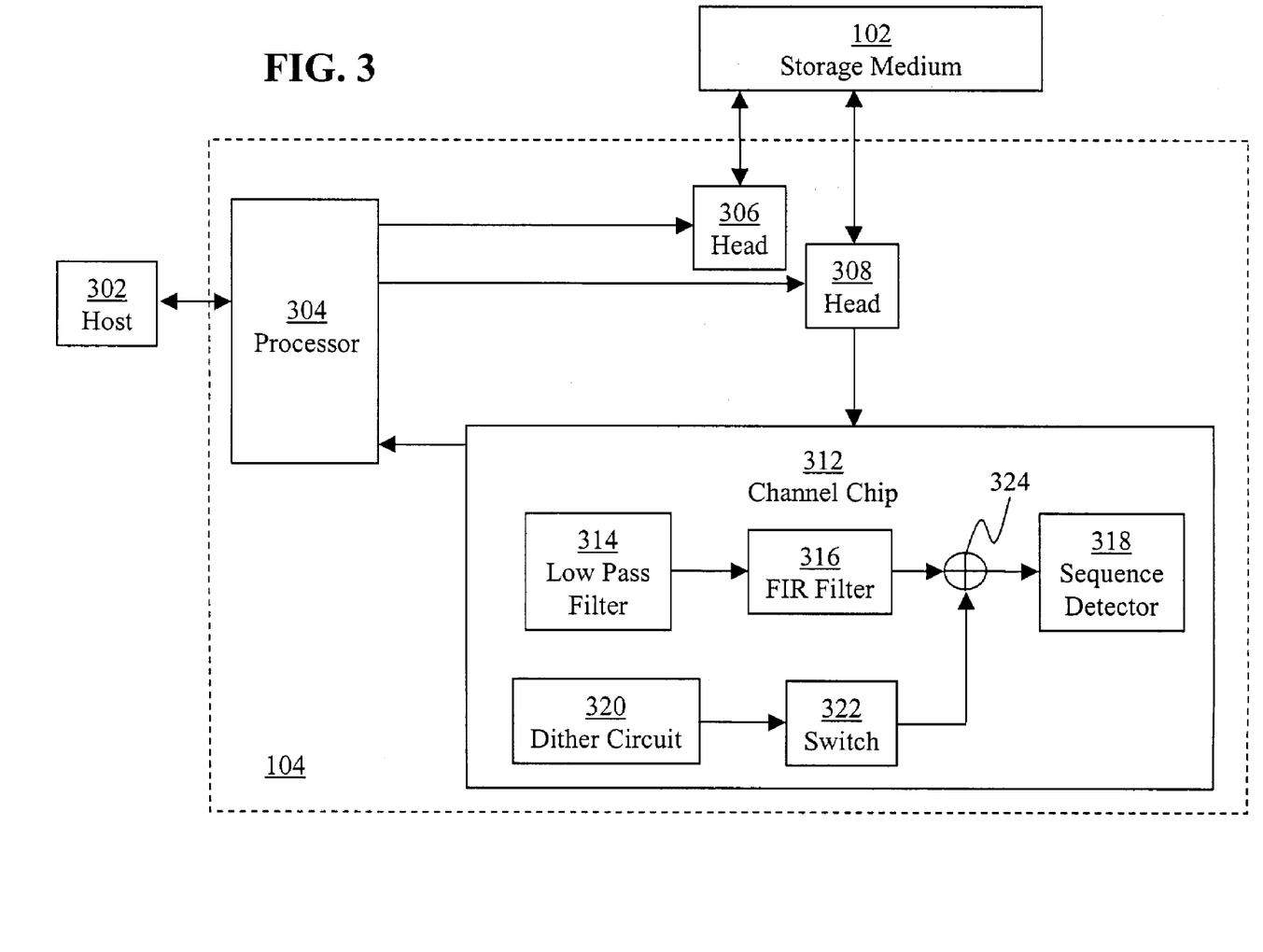
FIG. 3 depicts an exemplary block diagram of a host communicating with a data storage device and a removable data storage medium.

With reference to FIG. 3, in one exemplary embodiment, data storage device 104 includes a processor 304 that communicates with a host terminal 302. More specifically, processor 304 receives data to be stored on removable data storage medium 102 from host terminal 302, and sends data retrieved from removable data storage medium 102 to host terminal 302. It should be recognized that host terminal 302 can be any type of computer, such as a person computer, a workstation, a server, and the like.

As depicted in FIG. 3, data storage device 104 includes a write head 306 to write data onto removable data storage medium 102 and a read head 308 to read data from removable data storage medium 102. In the exemplary embodiment depicted in FIG. 3, data storage device 104 also includes a low-pass filter 314, a Finite Impulse Response (FIR) filter 316, and a sequence detector 318 to process the signal generated by read head 308 (i.e., the read signal). More specifically, low pass filter 314 can be configured to reduce band noise in the read signal. FIR filter 316 can be configured to shape the read signal into a pulse. Sequence detector 318 can be configured to provide a partial response maximum likelihood detection.

Additionally, in the exemplary embodiment depicted in FIG. 3, data storage device 104 includes a channel chip 312 corresponding to a data channel for reading data from and/or writing data to removable data storage medium 102. Thus, in the present exemplary embodiment, a write head 306 and a read head 308 is associated with a channel chip 312. It should be recognized, however, that data storage device 104 can include any number of channels, corresponding channel chips 312, and corresponding write heads 306 and read heads 308.

For example, when storage medium 102 is a magnetic tape cartridge with a magnetic tape and data storage device 104 is a tape drive, a channel can correspond to a track on the magnetic tape. As such, the tape drive (i.e., data storage device 104) can include multiple channels to read data from and/or write data to multiple tracks on the magnetic tape.

In the present exemplary embodiment, low-pass filter 314, FIR filter 316, and sequence detector 318 are depicted as being disposed within channel chip 312. It should be recognized, however, that the various components of data storage device 104 depicted in FIG. 3 can be arranged in various configurations. Additionally, it should be recognized that any one or more of the components of data storage device 104 depicted in FIG. 3 can be omitted depending on the application. Furthermore, data storage device 104 can include any number of additional components not depicted in FIG. 3 depending on the application.

In one exemplary embodiment, data is stored on the removable data storage medium 102 during a write process and retrieved during a read process. Additionally, during the write process, data storage device 104 is configured to check for errors in writing the data to removable data storage medium 102 using a read-after-write operation.

More particularly, as described above, data storage device 104 includes write head 306 and read head 308. During a write process, write head 306 writes data to removable data storage medium 102, and during a read process read head 308 reads data from removable data storage medium 102. Additionally, during the write process, as part of a read-after-write operation, read head 308 reads data written by write head 306 to check for errors in writing the data to removable data storage medium 102. If an error is detected, the data can be rewritten. For example, write head 306 can re-write the data to a different portion of the removable data storage medium 102.

In the exemplary embodiment depicted in FIG. 3, write head 306 and read head 308 are depicted separately. It should be recognized, however, that write head 306 and read head 308 can be clustered together. It should also be recognized that the read-after-write operation can be performed and data can be re-written when an error is detected while the removable data storage medium 102 operates in multiple directions. For example, with reference to FIG. 2, if removable data storage medium 102 is a magnetic tape cartridge with a magnetic tape, the read-after-write operation can be performed and data can be re-written when an error is detected while the tape is being spooled onto take-up reel 206 (i.e., in a first direction) or while the tape is being spooled onto supply reel 204 (i.e., in a second direction opposite the first direction).

With reference again to FIG. 1, in one exemplary embodiment, data is written to and/or read from removable data storage medium 102 in data blocks of a predetermined length, such as 2 kBytes, 4 kBytes, 6 kBytes, and the like. Additionally, Cyclic Redundancy Codes (CRCs) can be used to detect errors in data blocks written to removable data storage medium 102. More specifically, prior to writing a data block in removable data storage medium 102, a CRC is generated for the data block. When the data block is later read, a new CRC is generated for the retrieved data block. The new CRC is then compared to the CRC that was originally generated for the data block before writing the data block in removable data storage medium 102. If the new CRC and the original CRC differ, then an error is detected for that data block, and the data block is rewritten. It should be recognized, however, that data blocks of various lengths may be used, and various error detection techniques may be used.

As described above, a removable data storage medium 102 can be used in any number of different data storage devices 104, and a data storage device 104 can be used with any number of different removable storage media 102. Thus, data written to a removable data storage medium 102 using one data storage device 104 (i.e., a first data storage device) may be read by another data storage device 104 (i.e., a second data storage device). However, for a number of reasons, such as variability between different storage medium and read head manufacturers, data written on a removable data storage medium using one data storage device cannot always be read using another data storage device.

For example, assume that data is being written to a first portion of a removable data storage medium on a first data storage device. Assume that when the data is being written during a write process, a read-after-write operation is performed using a read head in the first data storage device. More specifically, as described above, after the data is written to the first portion of the removable data storage medium, a read head is used to read the data from the first portion to detect an error. As also described above, if an error is detected, then the data is re-written to a second portion of the removable data storage medium. If an error is not detected, then the data is not re-written.

For the sake of this example, assume that the read head in the first data storage device is able to read the data, an error is not detected, and thus the data is not re-written to the second portion of the removable data storage medium. Now assume that the removable data storage medium is loaded into a second data storage device to be read. If the read head in the second data storage device is unable to read the data from the first portion of the removable data storage medium, the data cannot be retrieved using the second data storage device because the data was not re-written to the second portion.

Thus, in one exemplary embodiment, data storage device 104 is configured to artificially degrade the read-back signal (i.e., the signal generated by a read head during the write process) when data is written to a removable data storage medium 102. More particularly, with reference to FIG. 3, in the present exemplary embodiment, data storage device 104 includes a dither circuit 320 configured to generate a noise signal and add the noise signal into the read-back signal. By adding the noise signal to the read-back signal, more errors are detected and thus more data is re-written to the removable data storage medium than without the noise signal. In this manner, the interchangeability of removable data storage medium 102 and data storage devices 104 can be increased.

As described above, in the exemplary embodiment depicted in FIG. 3, data storage device 104 includes low-pass filter 314, FIR Filter 316, and sequence detector 318. As depicted in FIG. 3, in the present exemplary embodiment, the output of dither circuit 320 is connected to the output of FIR Filter 316. More particularly the outputs of dither circuit 320 and FIR Filter 316 are summed at summer 324 and fed to sequence detector 318.

Additionally, in the present exemplary embodiment, dither circuit 320 is connected to a switch 322 to selectively add a noise signal to the output of FIR Filter 316. More particularly, when switch 322 is in a first position (i.e., an on position), the noise signal generated by dither circuit 320 is fed into the output of FIR Filter 316. When switch 322 is in a second position (i.e., an off position), the noise signal generated by dither circuit 320 is not fed into the output of FIR Filter 316. Thus, when data is being read during a read process, switch 322 is in the off position to not add the noise signal into the signal produced by read head 308 (i.e., the read signal). Thus, the quality of the read signal produced by read head 308 during a read process is not artificially degraded by dither circuit 320. During the write process and more particularly as part of the read-after-write operation, switch 322 is in the on position to add the noise signal into the read-back signal. Note, however, that the noise signal generated by dither circuit 320 is not introduced into the signal associated with writing data to removable data storage medium 102. As such, the actual data stored on removable data storage medium 102 is not compromised by dither circuit 320.

As described above, by adding a noise signal into the read-back signal (i.e., the signal from read head 308 during the read-after-write operation of a write process), more errors are generated and thus more data is re-written to increase interchangeability of removable data media and data storage devices. In one exemplary embodiment, during the read-after-write operation, an error rate is determined and the amount of noise introduced into the read-back signal is adjusted based on the determined error rate.

Figure 4:
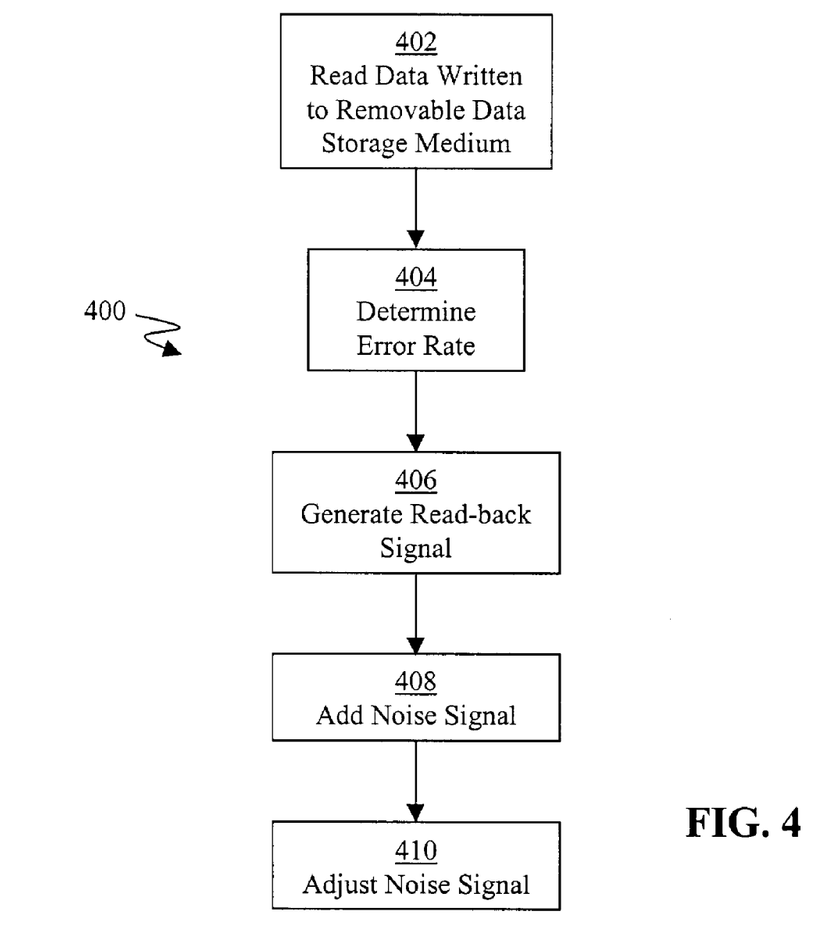
FIG. 4 is a flow chart of an exemplary process of introducing a noise signal into a read-back signal.

More particularly, with reference to FIG. 4, an exemplary process 400 is depicted to introduce a noise signal into a read-back signal during a write process. In step 402, while writing data to a removable data storage medium, a portion of the data written to the removable data medium is read. For example, as noted above, data can be written and read in data blocks. Thus, while the data is being written to the removable data storage medium, a data block that was written to the removable data storage medium is read. In this manner, each data block of the data is written then read to check for errors in writing the data to the removable data storage medium.

In step 404, an error rate is determined based on the portion of the data read from the removable data storage medium. It should be recognized that an error rate can be measured using various metrics, such as the number of errors detected within a certain amount of data being written. For example, when data is written in data blocks, an error rate can be determined by counting the number of errors after a certain number of data blocks have been written and read-back as part of the read-after-write operation. For example, if in writing 1000 data blocks a total of 2 errors are detected, the error rate would be 2 errors per 1000 data blocks. Alternatively, the error rate can be measured as the number of errors detected within a certain amount of bytes of data, such as a megabyte, gigabyte, and the like.

In step 406, a read-back signal corresponding to the portion of the data read from the removable data storage medium is read. As described above, the read-back signal is used to determine if an error occurred in writing the portion of the data to the removable data storage medium.

In step 408, a noise signal is added to the read-back signal. As described above, the noise signal artificially degrades the read-back signal to increase the amount of errors detected.

In step 410, the noise signal can be adjusted based on the determined error rate. Thus, a feedback is created such that the amount by which the read-back signal is degraded by the noise signal can be controlled.

For example, assume that data having 10,000 data blocks is to be written. Assume also that the first 1,000 data blocks are written then read to generate a read-back signal and to determine the error rate in writing the first 1,000 data blocks. Now assume that in reading the first 1,000 data blocks a noise signal was added to the read-back signal. The noise signal added to the read-back signal in checking the next 1,000 data blocks can be adjusted based on the error rate determined based on the first 1,000 data blocks. In this way, the noise signal can be adjusted adaptively rather than being fixed while writing the 10,000 data blocks.

It should be recognized that exemplary process 400 can include any number of additional steps not depicted in FIG. 4. Additionally, one or more steps depicted in FIG. 4 can be omitted from process 400. Furthermore, exemplary process 400 need not be performed in the order depicted in FIG. 4 or described above. For example, the error rate can be determined (step 404) after the read-back signal is generated (step 406) or after the noise signal is added to the read-back signal (step 408).

It should also be recognized that process 400 can be implemented as a computer program, which includes computer executable instructions to direct the operation of a data storage device. For example, with reference to FIG. 3, process 400 (FIG. 4) can direct the operation of channel chip 312 and/or processor 304 of data storage device 104. With reference again to FIG. 4, exemplary process 400 can be implemented in hardware, such as in an Application-Specific Integrated Circuit (ASIC), or a combination of software and hardware.

With reference again to FIG. 4, in one exemplary embodiment, a minimum error rate is established, which can be used in multiple data storage devices. Thus, in the present exemplary embodiment, if the error rate determined in step 404 is less than the minimum error rate, the noise signal is adjusted (step 410) by increasing the noise signal to correspondingly increase the error rate and the amount of re-written data.

It should be recognized that a minimum error rate can be established based on various factors and/or considerations. For example, increasing the minimum error rate increases the error rate, the amount of re-written data, and thus the interchangeability of removable storage media and data storage devices, but decreases the available storage capacity of the removable data storage medium. Conversely, decreasing the minimum error rate decreases the error rate, the amount re-written data, and thus the interchangeability of removable storage media and data storage devices, but increases the available storage capacity of the removable data storage medium.

In another exemplary embodiment, in addition to a minimum error rate, a maximum error rate is established. Thus, if the error rate is above the maximum error rate, the amount of noise introduced is decreased. In this manner, the amount of noise introduced is maintained between a range corresponding to the established maximum and minimum error rates.

In still another exemplary embodiment, in addition to establishing a minimum error rate, a maximum amount of noise to be introduced (i.e., a maximum noise level) is established. Thus, even if the error rate is below the minimum error rate, the amount of noise introduced is not increased above the maximum noise level. Similarly, in addition to establishing a maximum error rate, a minimum amount of noise to be introduced (i.e., a minimum noise level) is established. Thus, even if the error rate is above the maximum error rate, the amount of noise introduced is not decreased below the minimum noise level. Thus, the amount of noise introduced is maintained between a range corresponding to the maximum and minimum noise levels.

Figure 5:
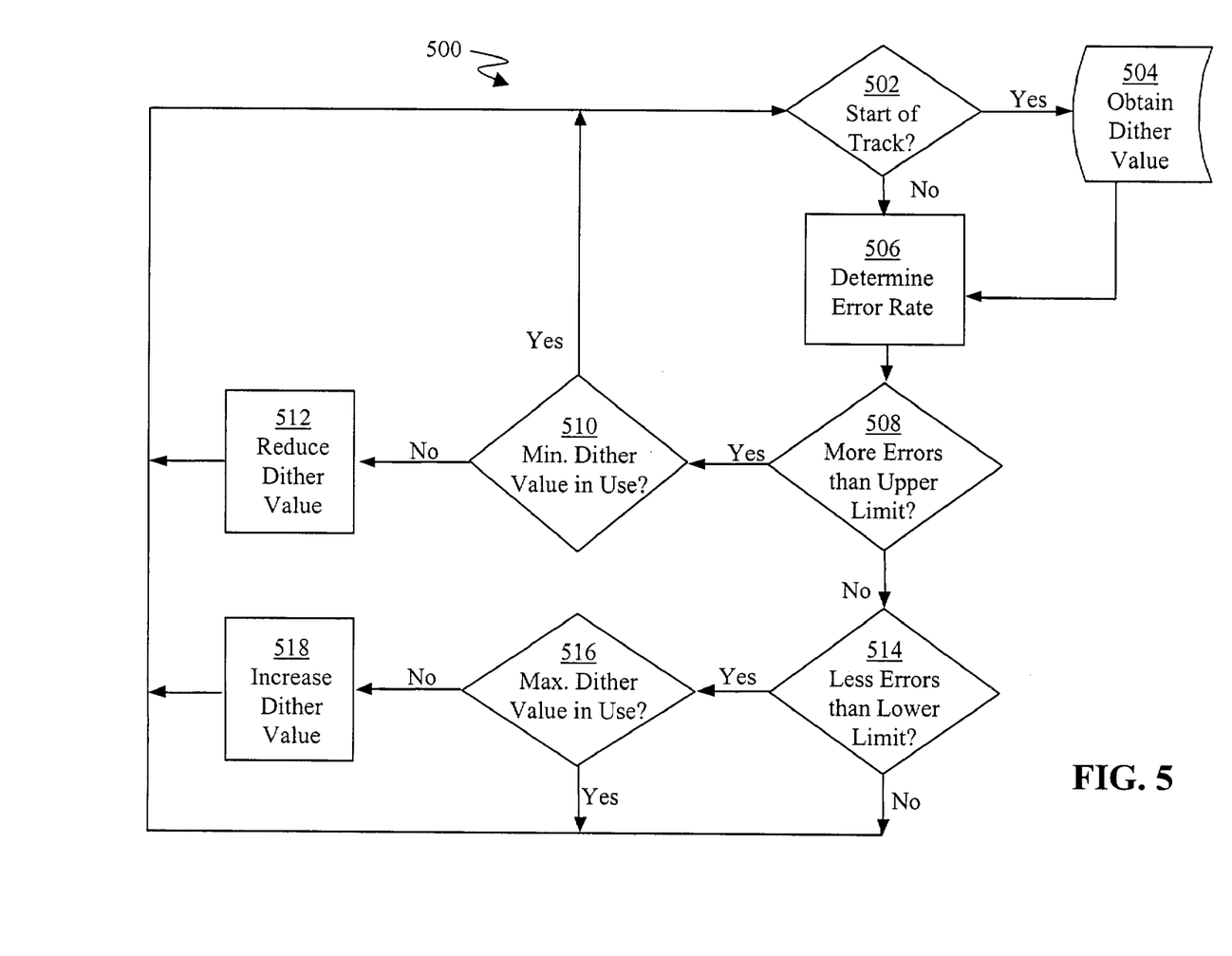
FIG. 5 is a flow chart of another exemplary process of introducing a noise signal into a read-back signal.

With reference now to FIG. 5, another exemplary process 500 is depicted to introduce a noise signal into a read-back signal during a write process. In exemplary process 500 depicted in FIG. 5, the introduced noise signal is a pseudo-random white Gaussian noise, such as a dither signal. It should be recognized, however, that various types of noise signals can be used.

In step 502, a determination is made as to whether the data is being written to the start of a track. As described above, in one exemplary embodiment, data can be written to a removable data storage medium in one or more tracks. For example, if the removable data storage medium is a tape cartridge with a magnetic tape, data can be written to multiple tracks on the tape.

If data is being written to the start of a new track, in step 504, an initial dither value is obtained. For a particular channel or read head in the data storage device, the initial dither value can be the dither value for the channel or read head used in writing data to the previous track. Alternatively, the initial dither value can be an established default value or an optimized value determined using a calibration process. For a detailed description of a dither value calibration process see U.S. patent application Ser. No. 10/043,597, entitled ENHANCED READ MARGINING USING DITHER ENHANCED WRITE MARGINALIZATION FOR MASS DATA STORAGE APPLICATIONS, filed on Jan. 9, 2002, which is incorporated herein by reference in its entirety.

If data is not being written to the start of a new track or after an initial dither value is obtained, in step 506, an error rate is determined. More particularly, the number of errors detected while writing a certain amount of data is determined. However, as noted above, an error rate can be measuring using various metrics.

After determining the error rate, in step 508, the determined error rate is compared to an established maximum error rate (i.e., an upper limit). If the determine error rate is more than the upper limit, then in step 510 the current dither value is compared to an established minimum dither value. If the current dither value is the same as the minimum dither value, then the current dither value is maintained. If the current dither value is not the same as the minimum dither value, then in step 512 the current dither value is reduced by an increment.

In step 508, if the determined error rate is not more than the upper limit, then in step 514 the determined error rate is compared to an established minimum error rate (i.e., a lower limit). If the determined error rate is not less than the lower limit, then the current dither value is maintained. If the determined error rate is less than the lower limit, then in step 516 the current dither value is compared to an established maximum dither value. If the current dither value is the same as the maximum dither value, then the current dither value is maintained. If the current dither value is not the same as the maximum dither value, then in step 518 the current dither value is increased by an increment.

It should be recognized that exemplary process 500 can include any number of additional steps not depicted in FIG. 5. Additionally, one or more steps depicted in FIG. 5 can be omitted from process 500. Furthermore, exemplary process 500 need not be performed in the order depicted in FIG. 5 or described above.

It should also be recognized that process 500 can be implemented as a computer program, which includes computer executable instructions to direct the operation of a data storage device. For example, with reference to FIG. 3, process 500 (FIG. 5) can direct the operation of channel chip 312 and/or processor 304 of data storage device 104. With reference again to FIG. 5, exemplary process 500 can be implemented in hardware, such as in an Application-Specific Integrated Circuit (ASIC), or a combination of software and hardware.

As noted above, data can be written to multiple tracks of a removable data storage medium. Thus, as also described above, with reference to FIG. 3, data storage device 104 can include multiple channels, corresponding channel chips 312, and corresponding write heads 306 and read heads 308. Additionally, data storage device 104 can include corresponding dither circuits 320 to introduce noise signals into the multiple channels.

For example, assume that data is written to 8 tracks using 8 channels, 8 corresponding write heads, and 8 corresponding read heads. For this example, assume that the maximum error rate is 5, the minimum error rate is 1, the maximum dither value is 17, and the minimum dither value is 2. Also assume that the start of the tracks are being written.

Thus, with reference to FIG. 5, in step 504, initial dither values for the channels are obtained. For this example, assume that initial dither values are as follows:

TABLE 1

Initial Dither Values

| CH 0 | CH 1 | CH 2 | CH 3 | CH 4 | CH 5 | CH 6 | CH 7 |
|------|------|------|------|------|------|------|------|
| 9    | 13   | 12   | 12   | 12   | 15   | 12   | 10   |

In step 506, an error rate is determined. For this example, assume that the following error rates are determined, where the error rates indicate the number of errors detected after 1000 data blocks have been written:

TABLE 2

Error Rates Per Channel

| CH 0 | CH 1 | CH 2 | CH 3 | CH 4 | CH 5 | CH 6 | CH 7 |
|------|------|------|------|------|------|------|------|
| 1    | 5    | 4    | 1    | 10   | 2    | 0    | 4    |

In step 508, the determined error rates are compared to the maximum error rate, which in this example is assumed to be 5. Because channel 4 has an error rate greater than 5, in step 510 the current dither value, which in this example is assumed to be 12, is compared with the minimum dither value, which in this example is assumed to be 2. Thus, for channel 4, in step 512, the dither value is decreased by an increment, which in this example is by 1.

Also, because in step 508 the error rates of the other channels were not more than 5, in step 514 the error rates of these channels are compared to the minimum error rate, which in this example is assumed to be 1. Because channel 6 has an error rate less than 1, in step 516 the current dither value for channel 6, which in this example is 12, is compared with the maximum dither value, which in this example is assumed to be 17. Thus, in step 518, the dither value for channel 6 is increased by an increment, which in this example is by 1.

Table 3 summarizes the newly adapted dither values for the channels:

TABLE 3

| Adapted Dither Values | | | | | | | |
|---|---|---|---|---|---|---|---|
| CH 0 | CH 1 | CH 2 | CH 3 | CH 4 | CH 5 | CH 6 | CH 7 |
| 9 | 13 | 12 | 12 | 11 | 15 | 13 | 10 |

Returning to step 506, a new set of error rates is determined for the channels. In this example, assume that the following error rates are determined:

TABLE 4

| Error Rates Per Channel | | | | | | | |
|---|---|---|---|---|---|---|---|
| CH 0 | CH 1 | CH 2 | CH 3 | CH 4 | CH 5 | CH 6 | CH 7 |
| 3 | 5 | 4 | 1 | 2 | 1 | 2 | 7 |

Now channel 7 has an error rate greater than the maximum error rate. Because the dither value for channel 7 is greater than the minimum dither value, the dither value for channel 7 is decreased. Note that because the error rates for all of the remaining channels are within the range of the maximum and minimum error rates, the dither values for these channels are maintained.

Table 3 summarizes the newly adapted dither values for the channels:

TABLE 5

| Adapted Dither Values | | | | | | | |
|---|---|---|---|---|---|---|---|
| CH 0 | CH 1 | CH 2 | CH 3 | CH 4 | CH 5 | CH 6 | CH 7 |
| 9 | 13 | 12 | 12 | 11 | 15 | 12 | 9 |

A new set of error rates is again determined for the channels. In this example, assume that the following error rates are determined:

TABLE 6

| Error Rates Per Channel | | | | | | | |
|---|---|---|---|---|---|---|---|
| CH 0 | CH 1 | CH 2 | CH 3 | CH 4 | CH 5 | CH 6 | CH 7 |
| 2 | 1 | 4 | 4 | 2 | 3 | 0 | 3 |

Now channel 6 has an error rate less than the minimum error rate. Because the dither value for channel 6 is less than the maximum dither value, the dither value for channel 6 is increased. Note that because the error rates for all of the remaining channels are within the range of the maximum and minimum error rates, the dither values for these channels are maintained.

Table 3 summarizes the newly adapted dither values for the channels:

TABLE 7

| Adapted Dither Values | | | | | | | |
|---|---|---|---|---|---|---|---|
| CH 0 | CH 1 | CH 2 | CH 3 | CH 4 | CH 5 | CH 6 | CH 7 |
| 9 | 13 | 12 | 12 | 11 | 15 | 13 | 9 |

A new set of error rates is again determined for the channels. In this example, assume that the following error rates are determined:

TABLE 8

| Error Rates Per Channel | | | | | | | |
|---|---|---|---|---|---|---|---|
| CH 0 | CH 1 | CH 2 | CH 3 | CH 4 | CH 5 | CH 6 | CH 7 |
| 2 | 4 | 2 | 2 | 5 | 1 | 2 | 4 |

Note that because the error rates for all of the channels are within the range of the maximum and minimum error rates, the dither values for these channels will be maintained.

This process is repeated during the write process. When the removable data storage medium is a tape cartridge with a magnetic tape, this process can be repeated for the entire length of the magnetic tape as data is written on tracks on the magnetic tape. In one exemplary embodiment, the last adapted dither value for a channel can be stored and used again as the initial dither value for the channel when the channel is used again.

Although exemplary embodiments have been described, various modifications can be made without departing from the spirit and/or scope of the present invention. Therefore, the present invention should not be construed as being limited to the specific forms shown in the drawings and described above.

We claim:

1. A method of introducing a noise signal into a read-back signal when data is written to a removable data storage medium, the method comprising:
    while writing the data to the removable data storage medium, reading from the removable data storage medium a portion of the data written to the removable data storage medium;
    determining an error rate based on the portion of the data read from the removable data storage medium;
    generating a read-back signal corresponding to the portion of the data read from the removable data storage medium, wherein the read-back signal is used to detect if an error occurred in writing the portion of the data to the removable data storage medium;
    adding a noise signal to the read-back signal; and
    adjusting the noise signal based on the determined error rate.

2. The method of claim 1, wherein the portion of the data is read from a first portion of the removable data storage medium, wherein the portion of the data was earlier written to the first portion of the removable data storage medium, and further comprising:
    when an error is detected from the read-back signal, re-writing the portion of the data to a second portion of the removable data storage medium.

3. The method of claim 1, wherein determining an error rate comprises:

counting the number of errors in reading the portion of the data from the removable data storage medium.

4. The method of claim 1, wherein adjusting the noise signal comprises:
comparing the determined error rate to a minimum error rate; and
when the determined error rate is less than the minimum error rate, increasing the noise signal.

5. The method of claim 4, wherein multiple data storage devices that store and retrieve data using the removable data storage medium are configured to use the same minimum error rate.

6. The method of claim 5, wherein the multiple data storage devices are tape drives and the removable data storage medium is a magnetic tape cartridge with a magnetic tape.

7. The method of claim 4, wherein increasing the noise signal comprises:
comparing the noise signal to a maximum noise level; and
when the noise signal is less than the maximum noise level, increasing the noise signal by an increment.

8. The method of claim 4 further comprising:
comparing the determined error rate to a maximum error rate; and
when the determined error rate is more than the maximum error rate, reducing the noise signal.

9. The method of claim 8, wherein reducing the noise signal comprises:
comparing the noise signal to a minimum noise level; and
when the noise signal is more than the minimum noise level, reducing the noise signal by an increment.

10. The method of claim 1, wherein the noise signal is a pseudo-random white Gaussian noise.

11. The method of claim 10, wherein the noise signal is a dither signal, and adjusting the noise signal comprises:
adjusting the amplitude of the dither signal.

12. A system to introduce a noise signal into a read-back signal when data is written to a removable data storage medium, the system comprising:
a write head configured to write data to the removable data storage medium;
a read head configured to:
read a portion of the data written to the removable data storage medium while the write head writes the data to the removable data storage medium, and
generate a read-back signal corresponding to the portion of the data, wherein the read-back signal is used to detect if an error occurred in writing the portion of the data to the removable data storage medium;
a dither circuit configured to:
generate a noise signal, and
add the noise signal to the read-back signal; and
a processor configured to:
determine an error rate based on the portion of the data read from the removable data storage medium, and
adjust the noise signal based on the determined error rate.

13. The system of claim 12, wherein the write head is configured to write the portion of the data to a first portion of the removable data storage medium and re-write the portion of the data to a second portion of the removable data storage medium when an error is detected from the read-back signal.

14. The system of claim 13, wherein the read head and the write head are clustered together.

15. The system of claim 12, wherein the noise signal is adjusted by:

comparing the determined error rate to a minimum error rate; and
when the determined error rate is less than the minimum error rate, increasing the noise signal.

16. The system of claim 15, wherein multiple data storage devices that store and retrieve data using the removable data storage medium are configured to use the same minimum error rate.

17. The system of claim 16, wherein the multiple data storage devices are tape drives and the removable data storage medium is a magnetic tape cartridge with a magnetic tape.

18. The system of claim 15, wherein increasing the noise signal comprises:
comparing the noise signal to a maximum noise level; and
when the noise signal is less than the maximum noise level, increasing the noise signal by an increment.

19. The system of claim 15 further comprising:
comparing the determined error rate to a maximum error rate; and
when the determined error rate is more than the maximum error rate, reducing the noise signal.

20. The system of claim 19, wherein reducing the noise signal comprises:
comparing the noise signal to a minimum noise level; and
when the noise signal is more than the minimum noise level, reducing the noise signal by an increment.

21. The system of claim 12, wherein the noise signal is a pseudo-random white Gaussian noise.

22. The system of claim 20, wherein the noise signal is a dither signal, and wherein the noise signal is adjusted by:
adjusting the amplitude of the dither signal.

23. A tape drive configured to introduce a noise signal into a read-back signal when data is written to a tape cartridge, the tape drive comprising:
a write head configured to write data to the tape cartridge;
a read head configured to:
read a portion of the data written to the tape cartridge while the write head writes the data to the tape cartridge, and
generate a read-back signal corresponding to the portion of the data, wherein the read-back signal is used to detect if an error occurred in writing the portion of the data to the tape cartridge;
a dither circuit configured to:
generate a noise signal, and
add the noise signal to the read-back signal; and
a processor configured to:
determine an error rate based on the portion of the data read from the tape cartridge, and
adjust the noise signal based on the determined error rate.

24. The tape drive of claim 23, wherein the write head is configured to write the portion of the data to a first portion of the removable data storage medium and re-write the portion of the data to a second portion of the removable data storage medium when an error is detected from the read-back signal.

25. The tape drive of claim 24, wherein the read head and the write head are clustered together.

26. The tape drive of claim 23, wherein the noise signal is adjusted by:
comparing the determined error rate to a minimum error rate; and
when the determined error rate is less than the minimum error rate, comparing the noise signal to a maximum noise level, and when the noise signal is less than the maximum noise level, increasing the noise signal by an increment.

27. The tape drive of claim 26 further comprising:

comparing the determined error rate to a maximum error rate; and when the determined error rate is more than the maximum error rate, comparing the noise signal to a minimum noise level, and when the noise signal is more than the minimum noise level, reducing the noise signal by an increment.

28. A computer-readable storage medium containing computer executable code to introduce a noise signal into a read-back signal when data is written to a removable data storage medium by instructing a data storage device to operate as follows:

while writing the data to the removable data storage medium, reading from the removable data storage medium a portion of the data written to the removable data storage medium;

determining an error rate based on the portion of the data read from the removable data storage medium;

generating a read-back signal corresponding to the portion of the data read from the removable data storage medium, wherein the read-back signal is used to detect if an error occurred in writing the portion of the data to the removable data storage medium;

adding a noise signal to the read-back signal; and adjusting the noise signal based on the determined error rate.

29. The computer-readable storage medium of claim 28, wherein adjusting the noise signal comprises:

comparing the determined error rate to a minimum error rate; and when the determined error rate is less than the minimum error rate, comparing the noise signal to a maximum noise level, and when the noise signal is less than the maximum noise level, increasing the noise signal by an increment.

30. The computer-readable storage medium of claim 29 further comprising:

comparing the determined error rate to a maximum error rate; and when the determined error rate is more than the maximum error rate, comparing the noise signal to a minimum noise level, and when the noise signal is more than the minimum noise level, reducing the noise signal by an increment.

* * * * *